United States Patent
Lee et al.

(10) Patent No.: US 7,532,764 B2
(45) Date of Patent: May 12, 2009

(54) PREDICTION METHOD, APPARATUS, AND MEDIUM FOR VIDEO ENCODER

(75) Inventors: Jae-hun Lee, Gyeonggi-do (KR);
Nam-suk Lee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 879 days.

(21) Appl. No.: 10/855,343

(22) Filed: May 28, 2004

(65) Prior Publication Data

US 2005/0069211 A1    Mar. 31, 2005

(30) Foreign Application Priority Data

Sep. 30, 2003    (KR)    ............... 10-2003-0067908

(51) Int. Cl.
*G06K 9/46* (2006.01)
*H04N 7/12* (2006.01)

(52) U.S. Cl. ............... 382/238; 375/240.12; 348/384.1

(58) Field of Classification Search ......... 382/232–254; 375/240–240.01, 240.12–240.13; 348/384.1–418.1
See application file for complete search history.

(56) References Cited

U.S. PATENT DOCUMENTS

| | | | | |
|---|---|---|---|---|
| 5,903,673 | A * | 5/1999 | Wang et al. | 382/236 |
| 6,236,764 | B1 * | 5/2001 | Zhou | 382/266 |
| 6,389,073 | B1 * | 5/2002 | Kurobe et al. | 375/240.03 |
| 6,393,060 | B1 * | 5/2002 | Jeong | 375/240.19 |
| 6,442,204 | B1 * | 8/2002 | Snook et al. | 375/240.16 |
| 6,539,124 | B2 * | 3/2003 | Sethuraman et al. | 382/251 |
| 6,614,847 | B1 * | 9/2003 | Das et al. | 375/240.16 |
| 6,631,163 | B1 * | 10/2003 | Peng | 375/240.25 |
| 6,690,833 | B1 * | 2/2004 | Chiang et al. | 382/236 |
| 6,690,838 | B2 * | 2/2004 | Zhou | 382/266 |

(Continued)

FOREIGN PATENT DOCUMENTS

| CN | 1302510 A | 7/2001 |
|---|---|---|
| WO | WO 00/67486 | 11/2000 |

OTHER PUBLICATIONS

Tsekeridou, S.; Pitas, I., "MPEG-2 error concealment based on block-matching principles," IEEE Transactions on Circuits and Systems for Video Technology, vol. 10, No. 4, pp. 646-658, Jun. 2000.*

(Continued)

*Primary Examiner*—Matthew C Bella
*Assistant Examiner*—Manav Seth
(74) *Attorney, Agent, or Firm*—Staas & Halsey LLP

(57) ABSTRACT

A prediction method, apparatus, and medium including computer readable code, for calculating an average of intra-prediction costs or an average of inter-prediction costs of macroblocks of a received picture by encoding the received picture using an intra-prediction and/or inter-prediction in consideration of a type of the received picture, calculating a threshold value using the calculated average of intra-predication costs and/or inter-predication costs, and determining whether to perform intra-prediction on a subsequent picture based on the calculated threshold value. Accordingly, it is possible to considerably reduce the amount of computation that conventionally was required to encode a picture, without any deterioration in the encoding performance, by considerably reducing the number of macroblocks that need to undergo intra-prediction.

17 Claims, 9 Drawing Sheets

U.S. PATENT DOCUMENTS

| | | | |
|---|---|---|---|
| 6,697,433 B1* | 2/2004 | Isu et al. | 375/240.27 |
| 6,873,656 B2* | 3/2005 | Kim et al. | 375/240.13 |
| 6,996,177 B1* | 2/2006 | Beuker | 375/240.16 |
| 7,020,204 B2* | 3/2006 | Auvray et al. | 375/240.25 |
| 7,095,787 B2* | 8/2006 | Kadono et al. | 375/240.27 |
| 7,173,971 B2* | 2/2007 | Amara et al. | 375/240.27 |
| 7,266,247 B2* | 9/2007 | Kim et al. | 382/236 |
| 7,336,720 B2* | 2/2008 | Martemyanov et al. | 375/240.12 |
| 7,369,707 B2* | 5/2008 | Sakaguchi et al. | 382/239 |
| 7,385,650 B2* | 6/2008 | Kondo et al. | 348/561 |
| 2001/0021276 A1* | 9/2001 | Zhou | 382/266 |
| 2002/0106024 A1* | 8/2002 | Sato et al. | 375/240.12 |
| 2002/0118754 A1* | 8/2002 | Choi | 375/240.14 |
| 2002/0163969 A1* | 11/2002 | Zhong et al. | 375/240.17 |
| 2003/0012286 A1* | 1/2003 | Ishtiaq et al. | 375/240.27 |
| 2003/0053543 A1* | 3/2003 | Bhaumik et al. | 375/240.16 |
| 2003/0152150 A1* | 8/2003 | Fujimoto et al. | 375/240.24 |
| 2004/0233989 A1* | 11/2004 | Kobayashi et al. | 375/240.16 |
| 2005/0047504 A1* | 3/2005 | Sung et al. | 375/240.2 |
| 2005/0190841 A1* | 9/2005 | Sato et al. | 375/240.12 |
| 2005/0276323 A1* | 12/2005 | Martemyanov et al. | 375/240.03 |
| 2006/0002474 A1* | 1/2006 | Au et al. | 375/240.16 |
| 2006/0015508 A1* | 1/2006 | Kondo et al. | 707/10 |
| 2006/0038920 A1* | 2/2006 | Kondo et al. | 348/561 |

OTHER PUBLICATIONS

Sullivan, G.J.; Wiegand, T., "Rate-distortion optimization for video compression," Signal Processing Magazine, IEEE, vol. 15, No. 6, pp. 74-90, Nov. 1998.*

Related Chinese Office Action for Chinese Patent Application No. 200410080326.6.

* cited by examiner

PREDICTION METHOD, APPARATUS, AND MEDIUM FOR VIDEO ENCODER

CROSS-REFERENCE TO RELATED APPLICATIONS

This application claims the priority benefit of Korean Patent Application No. 2003-67908, filed on Sep. 30, 2003, in the Korean Intellectual Property Office, the disclosure of which is incorporated herein in its entirety by reference.

BACKGROUND OF THE INVENTION

1. Field of the Invention

The present invention relates to encoding of video data, and more particularly, to a prediction method and apparatus for video encoding.

2. Description of the Related Art

FIG. 1 is a block diagram illustrating an H.264 encoder. Referring to FIG. 1, the H.264 encoder includes a prediction unit 110, a transformation and quantization unit 120, and an entropy encoding unit 130.

The prediction unit 110 performs inter-prediction and intra-prediction. Inter-prediction, or inter-picture prediction, is a process of predicting a block of a current picture based on a corresponding block of a reference picture, which is stored in a buffer after being decoded and then deblocking-filtered. For performing an inter-prediction, the prediction unit 110 includes a motion estimator 111 and a motion compensator 112. On the other hand, intra-prediction, or an intra-picture prediction, is a process of predicting a predetermined block of a picture that has already been decoded, by using pixel data of blocks adjacent to the predetermined block.

The transformation and quantization unit 120 transforms and quantizes a sample block predicted by the prediction unit so that the sample block is compressed. The entropy coding unit 130 entropy-codes quantized video data in the form of an H.264 bitstream.

FIG. 2 is a diagram illustrating the structure of a group of pictures (GOP) 200. A set of pictures starting with an intra-coded picture (referred to as an I picture) is called a GOP. More specifically, a GOP of MPEG video data is comprised of three different types of pictures, i.e., an I picture, which is a compressed still picture, predictive pictures (referred to as P pictures), which are obtained by a forward prediction, and bidirectionally predictive pictures (referred to as B pictures), which are obtained by forward and backward predictions and a bi-directional prediction. In a GOP, an I picture is encoded without reference to P or B pictures.

The P pictures are encoded or decoded using information of their respective previous I and P pictures. The concept of such P picture encoding is based on the fact that in most cases, consecutive pictures of motion picture data are not so much different from one another that they more than often represent small movements or minor changes of picture blocks rather than dramatic ones. Therefore, since there are small movements of the picture blocks, if any, the consecutive pictures can be encoded by simply encoding differences among them.

The B pictures are encoded and decoded using information on their respective previous I and P pictures and subsequent I and P pictures. In such B picture encoding, a high compression rate can be achieved. Each of the B pictures is generated using a difference between its previous I and P pictures and a difference between its subsequent I and P pictures.

A motion picture encoder that adopts H.263 of the international Telecommunication Union Telecommunication Standardization Sector (ITU-T) or MPEG-2/4 of the International Standardization Organization (ISO)/the International Electronics Commission (IEC) determines a motion prediction mode for a P picture by performing inter-prediction using a result of performing a motion estimation on the P picture on a macroblock-by-macroblock basis and calculating a cost using a predetermined cost function. The cost can be calculated in various manners, for example, using a motion compensation error, i.e., a sum of absolute differences (SAD). More specifically, the motion picture encoder selects an inter-prediction mode if the SAD is smaller than a characteristic value of a current macroblock, such as a variance of values of pixels of the macroblock, and selects an intra-prediction mode if the SAD is not smaller than the characteristic value of the current macroblock.

A motion picture encoder that adopts H.264 of ITU-T or MPEG-4 AV of ISO/IEC determines a motion prediction mode for a P picture by performing both inter-prediction and intra-prediction operations. In other words, intra-prediction and inter-prediction are performed on every macroblock of the P picture, and then a cost obtained as a result of the intra-prediction and a cost obtained as a result of the inter-prediction are compared. Thereafter, the one with a smaller cost is selected between an inter-prediction mode and an intra-prediction mode.

The above-mentioned H.264 intra-prediction method provides thirteen prediction modes. More specifically, in the H.264 intra-prediction method, the thirteen prediction modes are broadly classified into nine 4×4 block prediction modes and four 16×16 block prediction modes according to the size of blocks to be predicted. The 4×4 block prediction modes or the 16×16 block prediction modes are differentiated from one another according to a prediction direction in which a predicted sample block is obtained using pixel values of blocks adjacent to a given 4×4 block to be predicted. In the H.264 intra-prediction method, intra-prediction is performed using each of the thirteen prediction modes, a prediction mode with the smallest cost is selected among the thirteen prediction modes, and then the smallest cost is compared with a cost obtained as a result of inter-prediction, which results in a considerable amount of computation.

SUMMARY OF THE INVENTION

Embodiments of the present invention provide a prediction method, apparatus, and medium including computer readable code for a motion picture encoding operation capable of reducing the amount of computation conventionally required.

Additional aspects and/or advantages of the invention will be set forth in part in the description which follows and, in part, will be obvious from the description, or may be learned by practice of the invention.

To accomplish the above and/or other aspects and advantages, embodiments of the present invention include a prediction method, including calculating an average of intra-prediction costs or an average of inter-prediction costs of macroblocks of a received picture by encoding the received picture using intra-prediction and/or inter-prediction based on a type of the received picture, calculating a threshold value based on the average of the intra-predication costs or the average of the inter-predication costs, and determining whether to perform intra-prediction on a subsequent picture based on the calculated threshold value.

To accomplish the above and/or further aspects and advantages, embodiments of the present invention include a prediction apparatus, including an encoding unit calculating an average of intra-prediction costs or an average of inter-prediction costs of macroblocks of a received picture by encoding the received picture using intra-prediction and/or inter-prediction in consideration of a type of the received picture, a threshold value calculation unit calculating a threshold value using the calculated average of intra-predication costs or inter-prediction costs, and a determination unit determining whether to perform intra-prediction on a subsequent picture based on the calculated threshold value obtained by the threshold value calculation unit.

To accomplish the above and/or still further aspects and advantages, embodiments of the present invention include a medium comprising computer readable code to control a calculating of an average of intra-prediction costs or an average of inter-prediction costs of macroblocks of a received picture by encoding the received picture using intra-prediction and/or inter-prediction in consideration of a type of the received picture, calculating of a threshold value based on the calculated average, and determining of whether to perform an intra-prediction on a subsequent picture based on the calculated threshold value.

Additional embodiments may further include a medium comprising computer readable code controlling an operation of a prediction method embodiment of the present invention and controlling a predication apparatus embodiment of the present invention to perform the calculating of the average of intra-prediction costs or inter-predication costs, calculating of the threshold value, and determining of whether to perform the intra-predication on a subsequent picture.

BRIEF DESCRIPTION OF THE DRAWINGS

These and/or other aspects and advantages of the present invention will become apparent and more readily appreciated from the following description of the embodiments, taken in conjunction with the accompanying drawings of which.

DETAILED DESCRIPTION OF THE PREFERRED EMBODIMENTS

Figure 1:
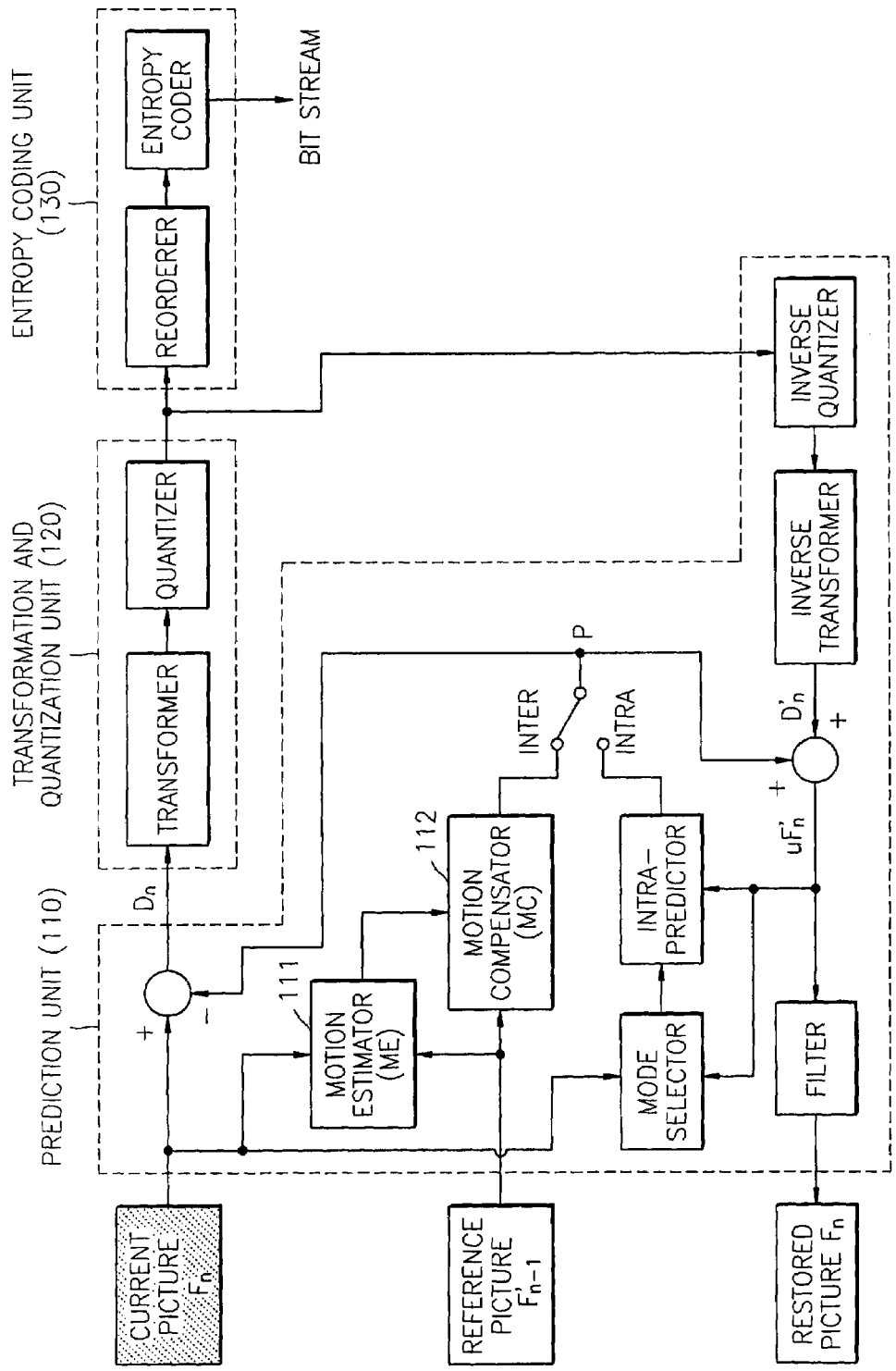
FIG. 1 is a block diagram illustrating an H.264 encoder.
Figure 2:
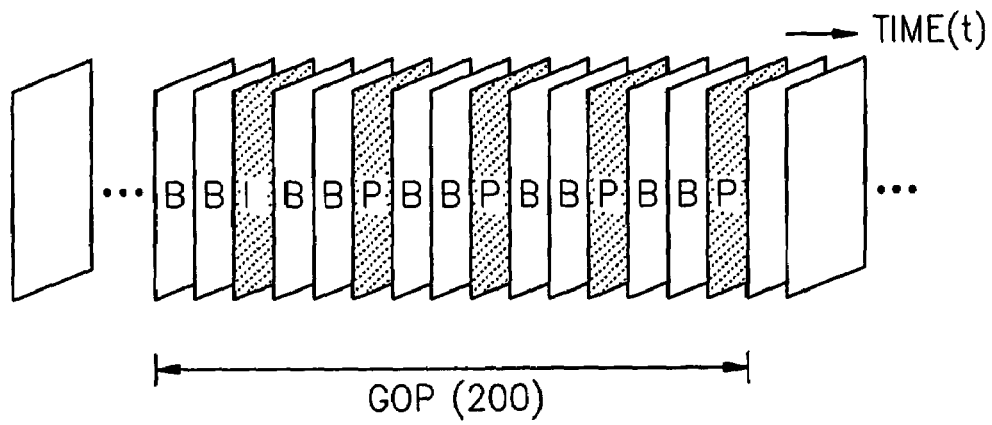
FIG. 2 is a diagram illustrating a group of pictures (GOP)

Reference will now be made in detail to the embodiments of the present invention, examples of which are illustrated in the accompanying drawings, wherein like reference numerals refer to the like elements throughout. The embodiments are described below to explain the present invention by referring to the figures.

In an encoding process, the number of macroblocks, for which an intra-prediction mode is selected, account for less than 10% of a total number of macroblocks. Therefore, in embodiments of the present invention, the amount of computations conventionally required to encode a motion picture is reduced by performing inter-prediction on most macroblocks of each picture and performing intra-prediction on only a few macroblocks that satisfy specific conditions.

Figure 3:
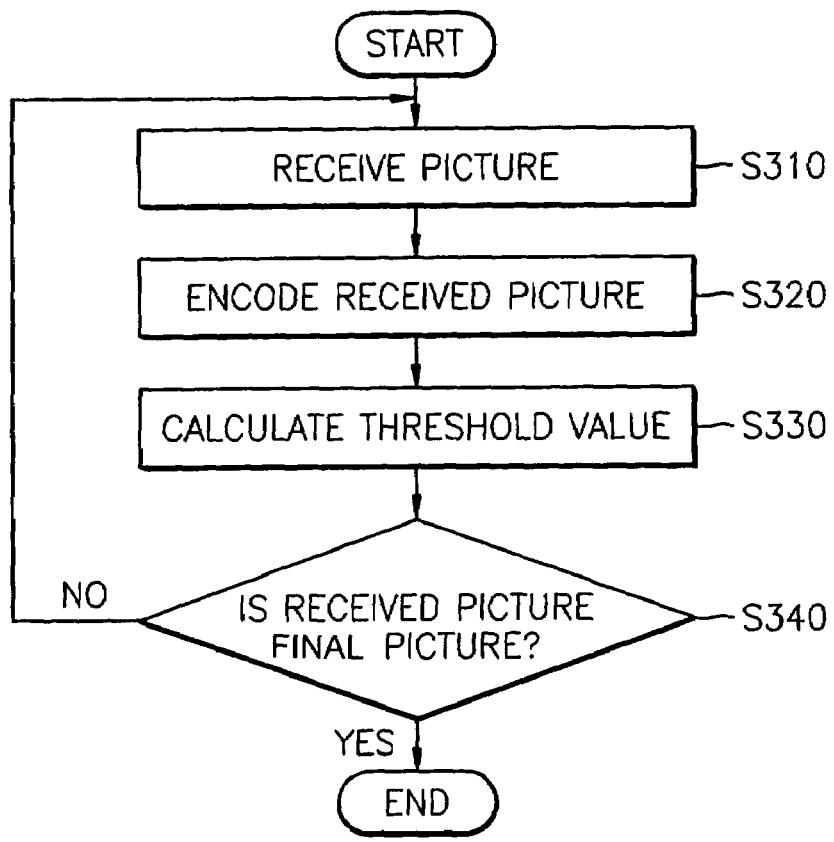
FIG. 3 is a flowchart illustrating a prediction method, according to an embodiment of the present invention.

FIG. 3 is a flowchart illustrating a prediction method, according to an embodiment of the present invention. Referring to FIG. 3, a picture is received, in operation S310, and in operation S320, the received picture is encoded. During the encoding of the received picture, it is determined first whether the received picture is an I picture or a P picture, and an appropriate encoding method for the determined type of the received picture is performed. In other words, if the received picture is an I picture, intra-prediction is performed on the received picture. If the received picture is a P picture, inter-prediction and the intra-prediction are performed on the received picture. Inter-prediction may be omitted by using a threshold value that has been obtained in the process of encoding a previous picture. A description of this process of encoding the received picture will be provided in more detail below. After the encoding of the received picture, an average of intra-prediction costs for an I picture and an average of inter-prediction costs for a P picture are output.

In operation S330, a threshold value, which is a benchmark for determining whether to perform intra-prediction on a next P picture, is calculated using averages of the inter-prediction costs for the P picture. In operation S340, it is determined whether the received picture is a final picture of a given group of pictures (GOP). If the received picture is not the final picture of the given GOP, the method returns to operation S310.

Figure 4:
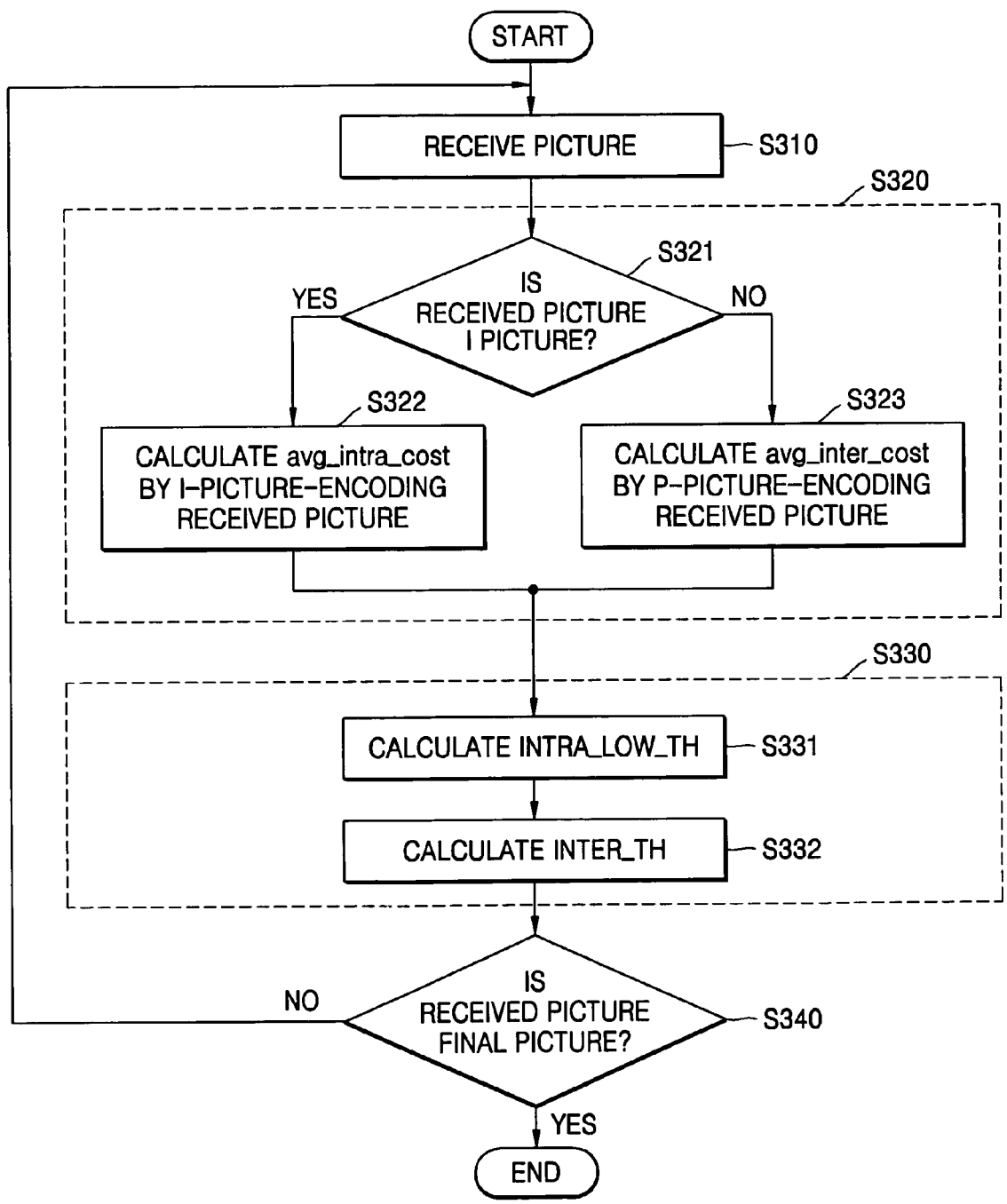
FIG. 4 is a detailed flowchart illustrating the prediction method of FIG. 3.

FIG. 4 is a detailed flowchart illustrating the prediction method of FIG. 3. Referring to FIG. 4, operation S320 includes: operation S321, where it is determined whether the received picture is an I picture, operation S322, where an I picture encoding is performed on the received picture, and operation S323, where a P picture encoding is performed on the received picture.

More specifically, if the received picture is an I picture, an average (avg_intra_cost) of intra-prediction costs of an I picture is calculated, in operation S322, by performing an I picture encoding on the received picture. If the received picture is a P picture, an average (avg_inter_cost) of inter-prediction costs for a P picture is calculated, in operation S323, by performing a P picture encoding on the received picture. In the I picture encoding, intra-prediction is performed on the received picture. On the other hand, in the P picture encoding, inter-prediction and intra-prediction are performed on the received picture. However, the intra-prediction performed in the P picture encoding may be omitted depending on a threshold value that has been obtained during encoding of a previous picture. The calculation of avg_intra_cost and avg_inter_cost will be described in greater detail with reference to FIGS. 5 and 6 below.

Operation S330, in which a threshold value is calculated, includes: operation S331, where a lower boundary (INTRA_LOW_TH) for avg_intra_cost is calculated, and operation S332, where a threshold value (INTER_TH), which is a benchmark for determining whether to perform inter-prediction on a received picture, is calculated.

In operation S331, the lower boundary (INTRA_LOW_TH) is calculated by the following equation: INTRA_LOW_TH=MAX($\alpha$*avg_inter_cost, INTER_LOW_TH) where $\alpha$ and INTER_LOW_TH are constants. More specifically, INTER_LOW_TH is a lower boundary for avg_inter_cost.

In operation S332, the threshold value (INTER_TH) is obtained using INTA_LOW_TH and avg_intra_cost by the following equation: INTER_TH=MAX(avg_intra_cost, INTRA_LOW_TH).

Figure 5:
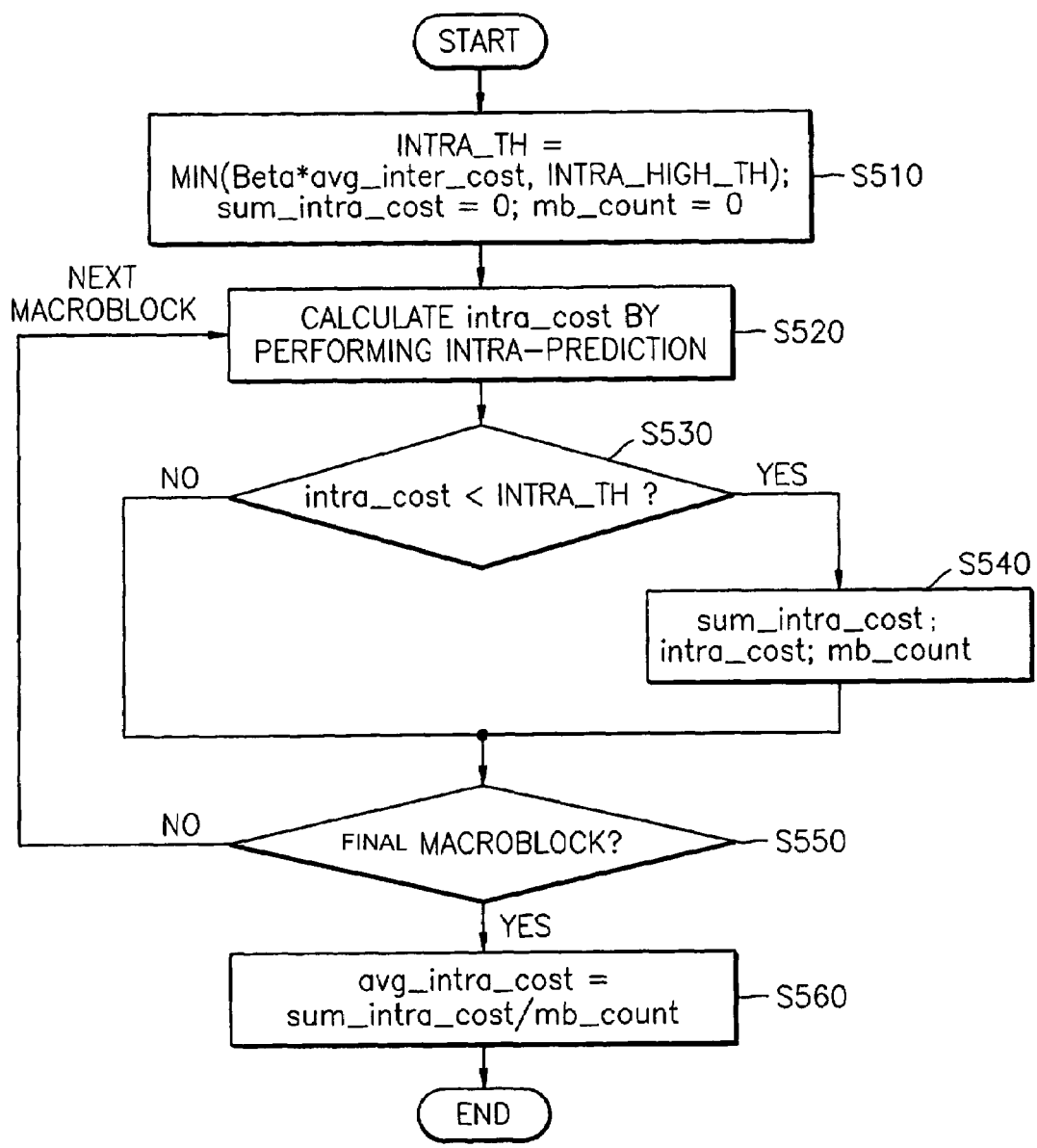
FIG. 5 is a flowchart illustrating a method of calculating an average of intra-prediction costs for an I picture, according to an embodiment of the present invention.

FIG. 5 is a flowchart illustrating a method of calculating an average (avg_intra_cost) of intra-prediction costs for an I picture. Referring to FIG. 5, in operation S510, a threshold value (INTRA_TH) is calculated using an average (avg_inter_cost) of inter-prediction costs for a previous P picture. The threshold value (INTRA_TH) is calculated by the following equation: INTRA_TH=MIN($\beta$*avg_inter_cost, INTRA_HIGH_TH) where the function MIN(a, b) outputs the smaller value between a and b, and $\beta$ and INTRA_HIGH_TH are constants. INTRA_HIGH_TH is an upper boundry for INTRA_TH. In order to calculate avg_intra_cost, variables sum_intra_cost and mb_count are initialized to 0.

In operation S520, an intra-prediction mode with a smallest intra_cost value is determined by performing intra-prediction on a given macroblock of an I picture in different intra-prediction modes, an intra-prediction mode with the smallest intra_cost value is selected among the intra-prediction modes, and intra_cost of the given macroblock is calculated according to the selected intra-prediction mode. In operation S530, intra_cost of the given macroblock is compared with INTRA_TH. In operation S540, intra_cost of the given macroblock is accumulated if it is smaller than INTRA_TH. In other words, in order to calculate avg_intra_cost, which is an average of intra_cost of each macroblock of the I picture, the different intra_costs having a value smaller than INTRA_TH are summed.

In operation S550, it is determined whether the given macroblock is a final macroblock of the I picture. In operation S560, avg_intra_cost is obtained by dividing a sum (sum_intra_cost) of intra_cost, based on values less than INTRA_TH, by a total number of macroblocks that have been used to calculate sum_intra_cost.

Figure 6:
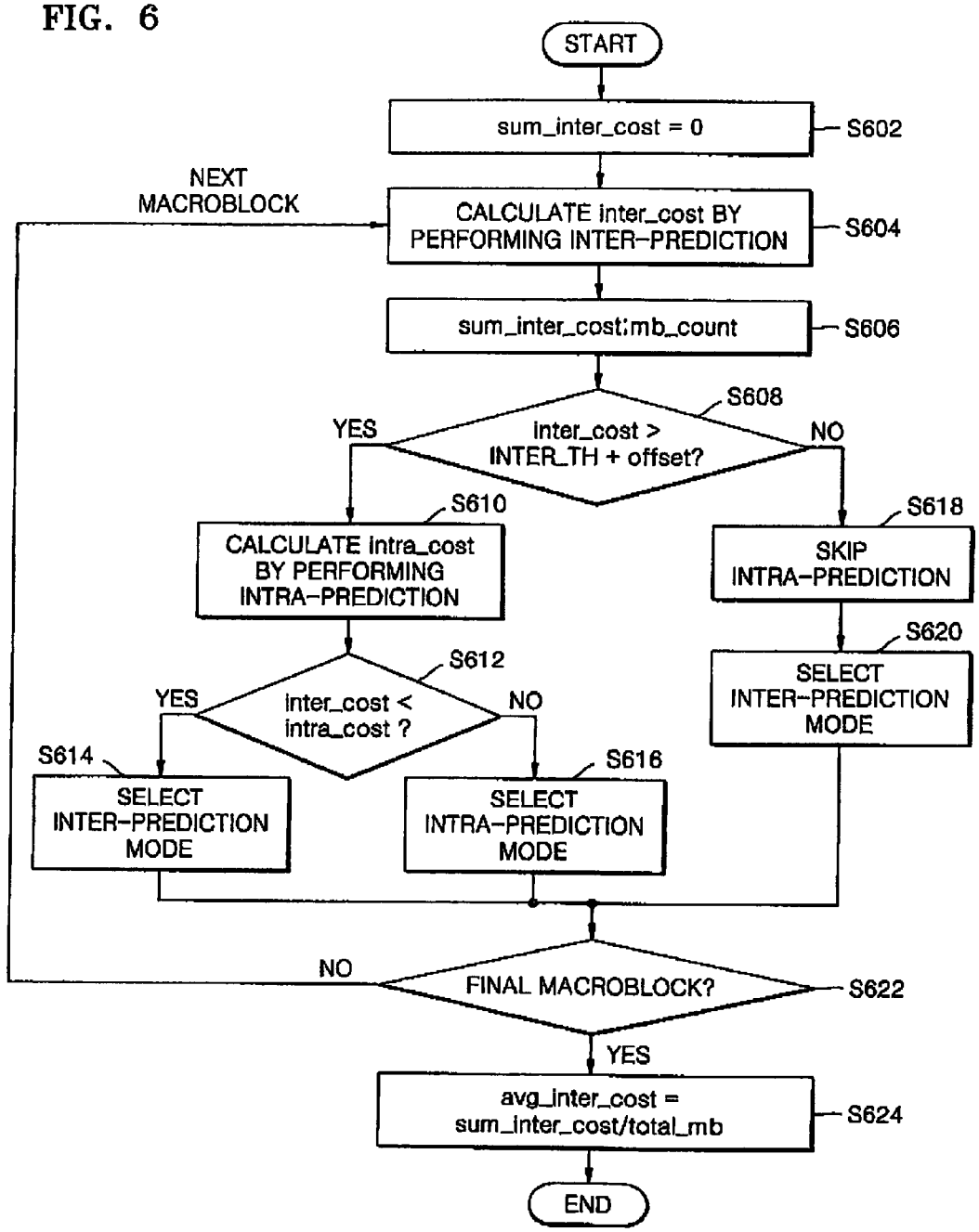
FIG. 6 is a flowchart illustrating a method of calculating an average of intra-prediction costs for a P picture, according to an embodiment of the present invention.

FIG. 6 is a flowchart illustrating a method of calculating an average (avg_inter_cost) of inter-prediction costs for a P picture. Referring to FIG. 6, avg_inter_cost is calculated using sum_inter_cost. In operation S602, sum_inter_cost is set to 0. In operation S604, an inter-prediction mode with a smallest inter_cost value is determined by performing an inter-prediction on each macroblock of a P picture in different inter-prediction modes, an inter-prediction mode with the smallest inter_cost value is selected among the different inter-prediction modes, and inter_cost of the given macroblock is calculated according to the selected inter-prediction mode. In operation S606, a sum (sum_inter_cost) of inter_cost is updated by accumulating inter_cost values.

In operation S608, it is determined whether inter_cost is greater than INTER_TH+offset (where offset is a constant that makes more macroblocks undergo an inter-prediction). If inter_cost is greater than INTER_TH+offset, intra-prediction is performed on the given macroblock applying different intra-prediction modes to the given macroblock, an intra-prediction mode with the smallest cost (intra_cost) is selected among the different intra-prediction modes, and intra_cost of the given macroblock is calculated, in operation S610. In operation S612, it is determined whether inter_cost is less than intra_cost. If inter_cost is less than intra_cost, an inter-prediction mode is determined as a prediction mode for the given macroblock, in operation S614. Otherwise, an intra-prediction mode is determined as the prediction mode for the given macroblock, in operation S616.

If inter_cost is not larger than INTER_TH+offset, intra-prediction is not performed on the given macroblock, in operation S618, and an inter-prediction mode is determined for the given macroblock, in operation S620. In operation S622, it is determined whether the given macroblock is a final block of the P picture. In operation S624, a sum (sum_inter_cost) of inter_cost values of all macroblocks of the P picture is obtained and then divided by a total number (total_mb) of macroblocks of the P picture.

In embodiments of the present invention, a cost is a residue value obtained by subtracting a predicted pixel value from an original pixel value of a sample block to be predicted and is used to calculate a sum of squared differences (SSD) and a sum of absolute transformed differences (SATD), which will be described in greater detail directly below.

Such costs can be calculated in various manners using different cost functions, such as an SAD, an SATD, an SSD, a mean of absolute differences (MAD), and a Lagrange function, for example. The SAD is a sum of absolute values of prediction errors (i.e., residues) of 4×4 blocks. The SATD is a sum of absolute values of coefficients obtained by applying a Hadamard transformation to the prediction errors of the 4×4 blocks. The SSD is a sum of squares of the prediction errors of the 4×4 blocks. The MAD is an average of the absolute values of the prediction errors of the 4×4 blocks. The Lagrange function is a new cost function including length information of a bitstream.

Figure 7:
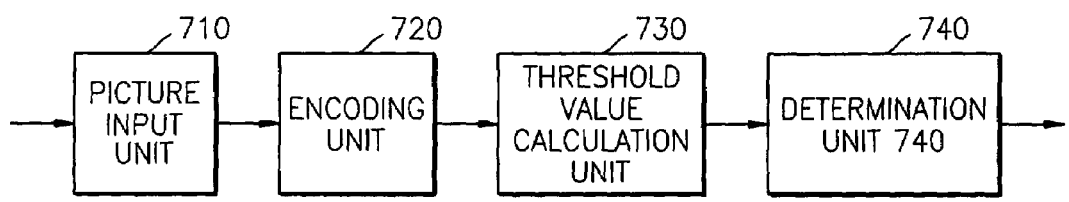
FIG. 7 is a block diagram illustrating a prediction apparatus, according to an embodiment of the present invention.

FIG. 7 is a block diagram illustrating a prediction apparatus, according to an embodiment of the present invention. Referring to FIG. 7, the prediction apparatus includes a picture input unit 710, an encoding unit 720, a threshold value calculation unit 730, and a determination unit 740.

The picture input unit 710 receives a picture. The picture could be either an I picture or a P picture. The encoding unit 720 encodes the received picture.

The threshold value calculation unit 730 calculates a threshold value, which is a benchmark for determining whether to perform inter-prediction on the received picture. A method of calculating the threshold value has already been described above. In addition, the determination of whether to perform inter-prediction on the received picture has already been described above with reference to FIG. 6.

Figure 8:
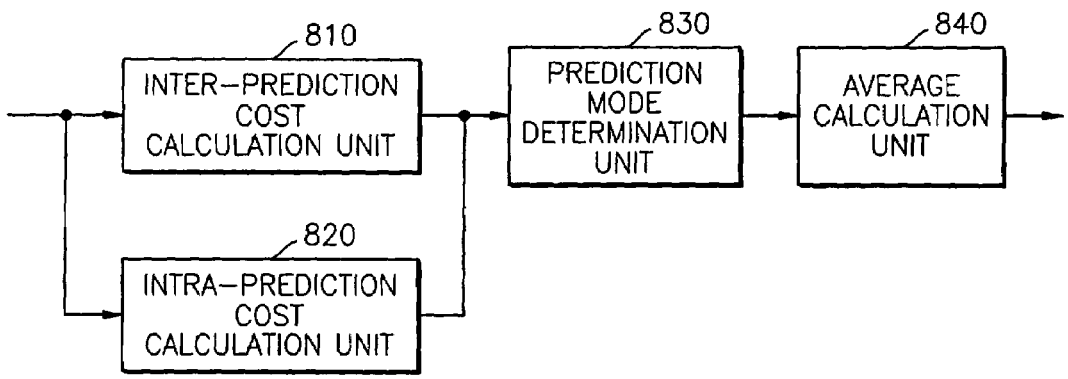
FIG. 8 is a detailed block diagram of an encoding unit of FIG. 7.

FIG. 8 is a detailed block diagram illustrating the encoding unit 720. Referring to FIG. 8, the encoding unit 720 includes an inter-prediction cost calculation unit 810, an intra-prediction cost calculation unit 820, a prediction mode determination unit 830, and an average calculation unit 840.

The inter-prediction cost calculation unit 810 obtains an inter-prediction cost by performing inter-prediction on a given macroblock of a P picture. The intra-prediction cost calculation unit 820 performs intra-prediction on the given macroblock if the inter-prediction cost is larger than a sum of a threshold value and a predetermined offset. If an intra-prediction cost is larger than the inter-prediction cost, the prediction mode determination unit 830 selects an inter-prediction mode. Otherwise, the prediction mode determination unit 830 selects an intra-prediction mode. The average calculation unit 840 calculates an average (avg_inter_cost) of inter-prediction costs of all macroblocks of the P picture. More specifically, if the received picture is an I picture, intra-prediction is performed on the received picture, and if the received picture is a P picture, inter-prediction is performed on the received picture. An average (avg_intra_cost) of intra-prediction costs of the macroblocks of the received picture is obtained by performing intra-prediction on each of the macroblocks of the received picture, and the average (avg_inter_cost) of the inter-prediction costs of the macroblocks of the received picture is obtained by performing inter-prediction on each of the macroblocks of the received picture.

Figure 9A:
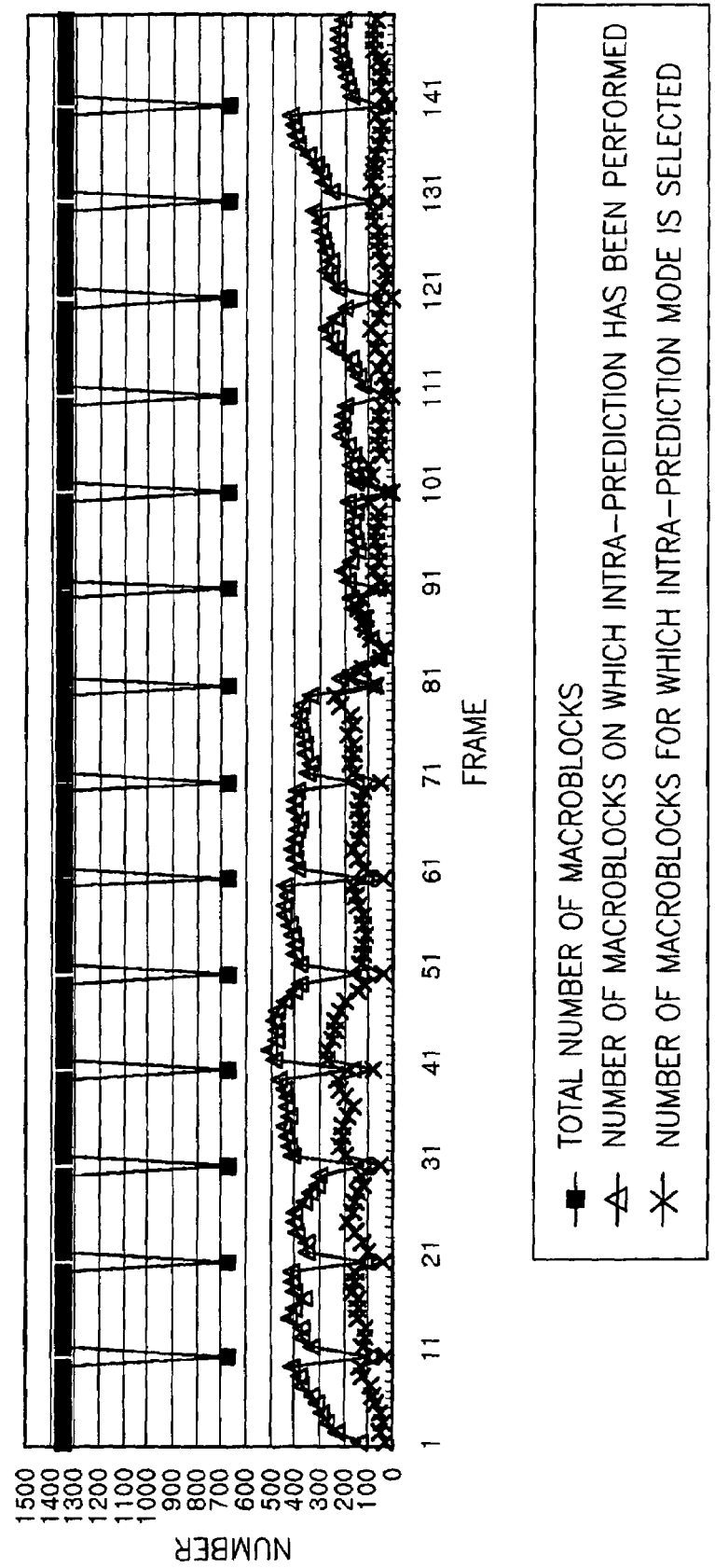
FIG. 9A is a diagram illustrating the number of macroblocks for which an intra-prediction mode is selected when a prediction method, according to an embodiment of the present invention, is applied to a football image.
Figure 9B:
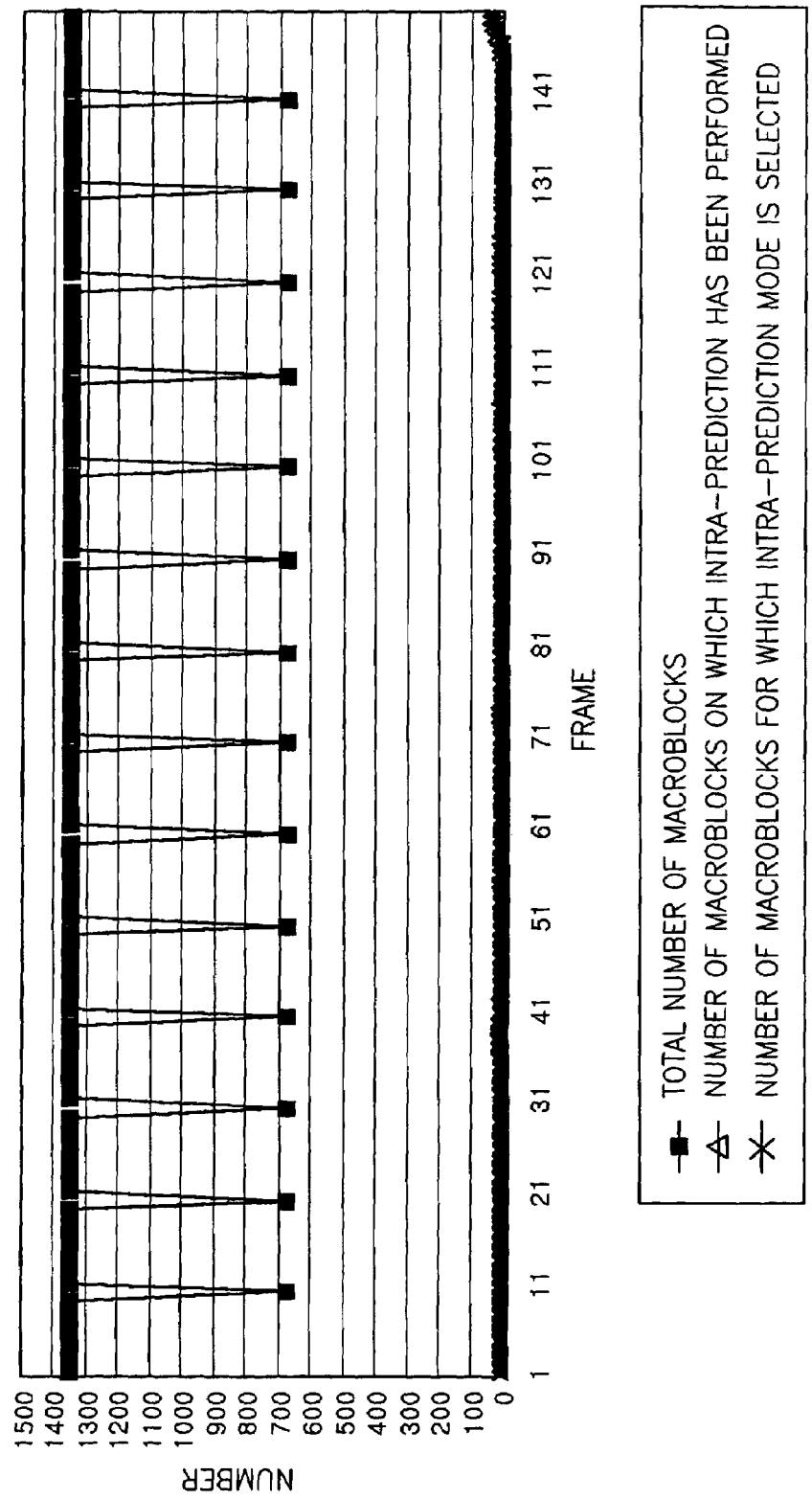
FIG. 9B is a diagram illustrating the number of macroblocks for which an intra-prediction mode is selected when a prediction method, according to an embodiment of the present invention, is applied to a Susie image.

FIG. 9A is a diagram illustrating the number of macroblocks for which an intra prediction mode is selected when a prediction method, according to an embodiment of the present invention, is applied to a football image, which is a standard image generally used as a benchmark for evaluation of the performance of H.264, and FIG. 9B is a diagram illustrating the number of macroblocks for which an intra prediction mode is selected when a prediction method, according to an embodiment of the present invention, is applied to a Susie image, which is also a standard image generally used as a benchmark for evaluation of the performance of H.264. Referring to FIGS. 9A and 9B, the number of macroblocks on which intra-prediction should be performed decreases considerably, and the number of macroblocks for which an intra-prediction mode is selected also decreases considerably. In the case of applying the present invention to the football image, a 77.58% decrease in the number of macroblocks that need to be intra-predicted is achieved. In the case of applying the present invention to the Susie image, a 99.85% decrease in the number of macroblocks that need to be intra-predicted is achieved.

Figure 10A:
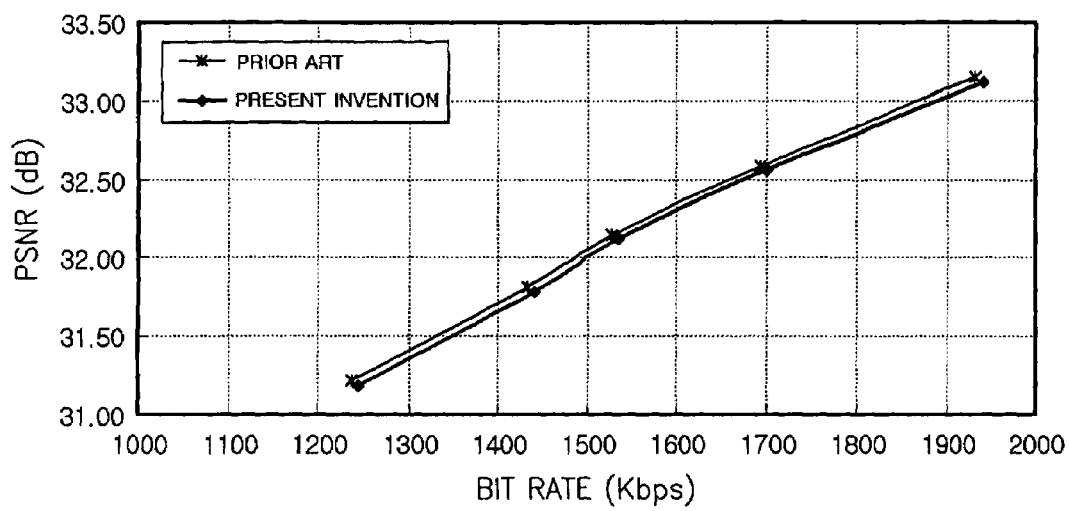
FIG. 10A is a graph illustrating the variation of peak signal-to-noise ratio (PSNR) of the football image of FIG. 9A.
Figure 10B:
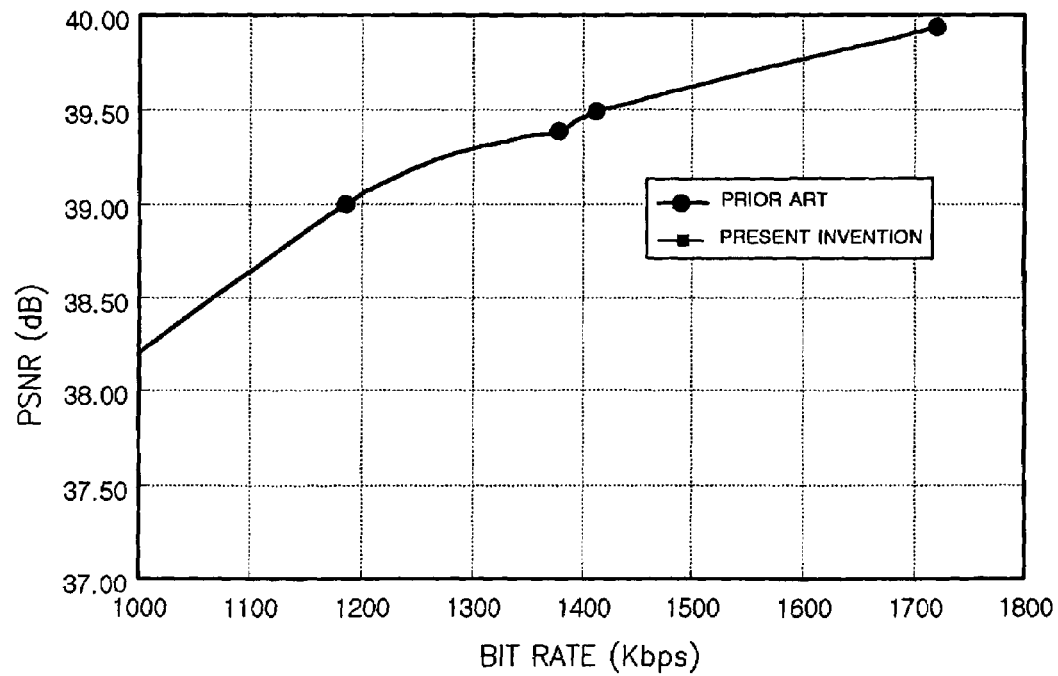
FIG. 10B is a graph illustrating the variation of PSNR of the Susie image of FIG. 9B.

FIG. 10A is a graph illustrating the variation of peak signal-to-noise ratio (PSNR) of the football image, and FIG. 10B is a graph illustrating the variation of PSNR of the Susie image. Referring to FIG. 10A and 10B, embodiments of the present invention make it possible to perform a prediction on pictures without deteriorating an entire encoding performance.

The present invention can be realized as computer-readable code written on a medium. The medium may be any kind of recording device on which data can be written/transferred in a computer-readable manner. For example, the computer-readable medium, e.g., a recording medium, could include a ROM, a RAM, a CD-ROM, a magnetic tape, a hard disk, a floppy disk, flash memory, an optical data storage. In addition, the computer-readable code can be distributed over a plurality of computer systems which are connected to one another in a network so that computer-readable code is stored in a medium, or media, in a decentralized manner.

As described above, according to the present invention, it is possible to considerably reduce the amount of computations that are conventionally required to encode a picture, without any deterioration in the encoding performance, by considerably reducing the number of macroblocks that need to be intra-predicted.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A prediction method, comprising:
    using a processor for calculating an average of intra-prediction costs or an average of inter-prediction costs of macroblocks of a received picture by encoding the received picture using intra-prediction and/or inter-prediction based on a type of the received picture;
    calculating a threshold value based on the average of the intra-predication costs or the average of the inter-predication costs; and
    determining whether to perform intra-prediction on a subsequent picture based on the calculated threshold value.

2. The prediction method of claim 1, wherein in the calculating of the average of intra-prediction costs or the average of the inter-prediction costs, if the received picture is an I picture, the received picture is encoded by performing the intra-prediction, and the average of intra-prediction costs of the macroblocks of the received picture is calculated.

3. The prediction method of claim 2, wherein in the calculating of the average of intra-predication costs or average of the inter-prediction costs, intra-prediction costs which are larger than a predetermined threshold value are excluded from the calculation of the average of the intra-prediction costs of the macroblocks of the received picture.

4. The prediction method of claim 1, wherein in the calculating of the average of intra-prediction costs or average of the inter-prediction costs, if the received picture is a P picture, the received picture is encoded by performing the inter-prediction and the intra-prediction, and the average of inter-prediction costs of the macroblocks of the received picture is calculated.

5. The prediction method of claim 4, wherein the calculating of the average of intra-prediction costs or average of the inter-predication costs further comprises:
    receiving a given macroblock of a P picture and calculating an inter-prediction cost of the given macroblock by performing the inter-prediction;
    calculating an intra-prediction cost of the given macroblock by performing the intra-prediction if the inter-prediction cost of the given macroblock is larger than a sum of the threshold value and a predetermined offset, selecting an inter-prediction mode if the intra-prediction cost of the given macroblock is larger than the inter-prediction cost of the given macroblock, and selecting an intra-prediction mode if the intra-prediction cost of the given macroblock is not larger than the inter-prediction cost of the given macroblock; and
    calculating an average of inter-prediction costs of macroblocks of the P picture by performing a receiving of another given macroblock and calculating a respective inter-predication cost, calculating a respective intra-prediction cost of the other given macroblock based on a size of the respective inter-predication costs, selecting of the inter-predication mode based on a size of the intra-predication cost, and selecting of the intra-prediction mode based on the size of the inter-predication cost of the other given macroblock, on each of the macroblocks of the P picture.

6. The prediction method of claim 5, wherein if the inter-prediction cost of the given macroblock is smaller than the sum of the threshold value and the predetermined offset, the inter-prediction mode is selected without performing the intra-prediction on the given macroblock of the P picture.

7. The prediction method of claim 1, wherein the calculating of the threshold value further comprises:
    calculating a lower boundary for the average of the inter-prediction costs of the macroblocks of the received picture based on: INTRA_LOW_TH=MAX($\alpha$*avg_inter_cost, INTER_LOW_TH), where avg inter cost represents the average of the inter-prediction costs of the macroblocks of the received picture, and INTRA_LOW_TH represents the lower boundary for avg_inter_cost; and
    calculating the threshold value based on: INTER_TH=Max(avg_intra_cost, INTRA_LOW_TH) where INTER_TH represents the threshold value, and avg_intra_cost represents the average of the intra-prediction costs of the macroblocks of the received picture.

8. The prediction method of claim 1, wherein a number of macroblocks, for which an intra-predication mode is selected, account for less than 10% of a total number of macroblocks.

9. A prediction apparatus, comprising:
an encoding unit calculating an average of intra-prediction costs or an average of inter-prediction costs of macroblocks of a received picture by encoding the received picture using intra-prediction and/or inter-prediction in consideration of a type of the received picture;
a threshold value calculation unit calculating a threshold value using the calculated average of intra-predication costs or inter-prediction costs; and
a determination unit determining whether to perform intra-prediction on a subsequent picture based on the calculated threshold value obtained by the threshold value calculation unit.

10. The prediction apparatus of claim 9, wherein if the received picture is an l picture, the encoding unit encodes the received picture by performing the intra-prediction and calculates the average of intra-prediction costs of the macroblocks of the received picture.

11. The prediction apparatus of claim 9, wherein if the received picture is a P picture, the encoding unit encodes the received picture by performing the inter-prediction and the intra-prediction and calculates the average of inter-prediction costs of the macroblocks of the received picture.

12. The prediction apparatus of claim 9, wherein the encoding unit comprises:
an inter-prediction cost calculation unit, which receives a given macroblock of a P picture and calculates an inter-prediction cost of the given macroblock by performing the inter-prediction;
an intra-prediction cost calculation unit, which calculates an intra-prediction cost of the given macroblock by performing the intra-prediction if the inter-prediction cost of the given macroblock is larger than a sum of the threshold value and a predetermined offset;
a prediction mode determination unit, which selects an inter-prediction mode, if the intra-prediction cost of the given macroblock is larger than the inter-prediction cost of the given macroblock, and selects an intra-prediction mode, if the intra-prediction cost of the given macroblock is not larger than the inter-prediction cost of the given macroblock; and an average calculation unit, which calculates an average of inter-prediction costs of all macroblocks of the P picture.

13. The prediction apparatus of claim 12, wherein the prediction mode determination unit selects the inter-prediction mode without performing the intra-prediction on the given macroblock of the P picture if the inter-prediction cost of the given macroblock is smaller than the sum of the threshold value and the predetermined offset.

14. The prediction apparatus of claim 9, wherein the determination unit calculates:
a lower boundary for the average of the inter-prediction costs of the macroblocks of the received picture based on: INTRA_LOW_TH=MAX($\alpha$*avg_inter_cost INTER_LOW_TH), where avg_inter_cost represents the average of the inter-prediction costs of the macroblocks of the received picture and INTRA_LOW_TH represents the lower boundary for avg_inter_cost; and
the threshold value based on: INTER_TH=Max(avg_intra_cost, INTRA_LOW_TH), where INTER_TH represents the threshold value, and avg_intra_cost represents the average of the intra-prediction costs of the blocks of the received picture.

15. The prediction apparatus of claim 9, wherein a number of macroblocks, for which an intra-predication mode is selected, account for less than 10% of a total number of macroblocks.

16. A computer readable storage medium structure comprising computer readable code to control a computer to implement a prediction method, the method comprising:
calculating of an average of intra-prediction costs or an average of inter-prediction costs of macroblocks of a received picture by encoding the received picture using intra-prediction and/or inter-prediction in consideration of a type of the received picture;
calculating of a threshold value based on the calculated average; and
determining of whether to perform an intra-prediction on a subsequent picture based on the calculated threshold value.

17. A computer readable storage medium structure comprising computer readable code to control the predication apparatus of claim 9 to perform the calculating of the average of intra-prediction costs or inter-predication costs, calculating of the threshold value, and determining of whether to perform the intra-predication on a subsequent picture.

* * * * *

UNITED STATES PATENT AND TRADEMARK OFFICE
CERTIFICATE OF CORRECTION

PATENT NO. : 7,532,764 B2
APPLICATION NO. : 10/855343
DATED : May 12, 2009
INVENTOR(S) : Jae-hun Lee et al.

It is certified that error appears in the above-identified patent and that said Letters Patent is hereby corrected as shown below:

Column 8, Lines 59-60, change "avg inter cost" to --avg_inter_cost--.

Column 9, Line 20, change "1" to --I--.

Column 10, Line 13, after "avg_inter_cost" insert --,--.

Column 10, Line 16, after "picture" insert --,--.

Signed and Sealed this

Twenty-fifth Day of August, 2009

David J. Kappos
*Director of the United States Patent and Trademark Office*